(12) United States Patent  (10) Patent No.: US 9,379,551 B2
Larsen  (45) Date of Patent: Jun. 28, 2016

(54) METHODS AND SYSTEMS FOR CONTROLLING A POWER CONVERTER

(75) Inventor: Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 961 days.

(21) Appl. No.: 13/572,416

(22) Filed: Aug. 10, 2012

(65) Prior Publication Data

US 2014/0043080 A1  Feb. 13, 2014

(51) Int. Cl.
*H03L 7/00* (2006.01)
*H02J 3/46* (2006.01)
*H02M 5/42* (2006.01)
*H02J 3/24* (2006.01)

(52) U.S. Cl.
CPC .. *H02J 3/46* (2013.01); *H02M 5/42* (2013.01); *H02J 3/24* (2013.01)

(58) Field of Classification Search
None
See application file for complete search history.

(56) References Cited

U.S. PATENT DOCUMENTS

| | | | |
|---|---|---|---|
| 7,095,131 B2 | 8/2006 | Mikhail et al. | |
| 7,492,617 B2 * | 2/2009 | Petter et al. | 363/41 |
| 7,603,202 B2 | 10/2009 | Weitkamp | |
| 7,808,126 B2 | 10/2010 | Stiesdal | |
| 7,830,029 B2 | 11/2010 | Wobben | |
| 7,999,406 B2 | 8/2011 | Cardinal et al. | |
| 2006/0273595 A1 | 12/2006 | Avagliano et al. | |
| 2009/0021877 A1 * | 1/2009 | Fornage et al. | 361/78 |
| 2012/0013376 A1 | 1/2012 | Thacker et al. | |

OTHER PUBLICATIONS

Wilkinson, Stan, Series Compensated Line Protection Issues, GER 3972, GE Power Management, Markham, Ontario, Canada.

* cited by examiner

*Primary Examiner* — Jared Fureman
*Assistant Examiner* — Aqeel Bukhari
(74) *Attorney, Agent, or Firm* — James McGinness, Esq.; Armstrong Teasdale LLP

(57) ABSTRACT

A line angle shift logic controller for use with a power generation system coupled to an electrical grid is disclosed. The line angle shift controller includes a line angle shift controller configured to receive a phase locked loop (PLL) error signal representative of a difference between a phase angle of the power generation system and a phase angle of the electrical grid, receive a threshold phase from the electrical grid, and generate a PLL shift signal based at least partially on the PLL error signal and the threshold phase.

18 Claims, 14 Drawing Sheets

METHODS AND SYSTEMS FOR CONTROLLING A POWER CONVERTER

BACKGROUND OF THE INVENTION

The embodiments described herein relate to controlling operation of power generation and delivery systems, and more specifically, to stabilizing a power converter after an electrical grid contingency event.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power.

Variable speed operation of the wind turbine generator facilitates enhanced capture of energy by the wind turbine generator when compared to a constant speed operation of the wind turbine generator. However, variable speed operation of the wind turbine generator produces electricity having varying voltage and/or frequency. More specifically, the frequency of the electricity generated by the variable speed wind turbine generator is proportional to the speed of rotation of the rotor. A power converter may be coupled between the electric generator and an electrical grid. The power converter outputs electricity having a fixed voltage and frequency for delivery on the electrical grid.

Power generated by an electric utility, using renewable sources of energy or fossil fuel based sources of energy, is typically delivered to a customer over an electrical grid. Electricity applied to the electrical grid is required to meet grid connectivity expectations. These requirements address safety issues as well as power quality concerns. For example, the grid connectivity expectations include operating the power generation system during a transient event, also referred to herein as a grid contingency event. Transient events may include grid fault conditions and weak grid conditions. This capability may be referred to as low voltage ride through (LVRT) or zero voltage ride through (ZVRT) event. An LVRT/ZVRT event is a condition where the alternating current (AC) utility voltage is low on either one phase of the electrical grid or multiple phases of the electrical grid During an LVRT/ZVRT event, the capacity of the electrical grid to accept power from the power generation system is low. Following switching actions in the external grid, the impedance of the grid may increase substantially leading to a condition referred to herein as a "weak grid". A weak grid may also arise in situations where a power generation system is connected to a grid in a location remote from other generation sources. In this type of situation, the ability to maintain grid connectivity through grid events may be reduced because a weaker alternating current transmission is available for the power generation system to synchronize its phase. When wind turbines are located in a weak grid, wind turbine power fluctuations may lead to an increase in magnitude and frequency variations in the grid voltage as measured by the wind turbine generator. These fluctuations may adversely affect the performance and stability of the wind turbine phase control.

Operation of the power converter is controlled to facilitate handling of the occurrence of grid contingency events. Once the grid contingency event dissipates, the power converter is controlled to facilitate recovery from the event and return the power generation system to steady-state operation. During the recovery, system oscillations may cause instability, for example, instability in a power output by the power converter.

BRIEF DESCRIPTION OF THE INVENTION

In one aspect, a line angle shift logic controller for use with a power generation system coupled to an electrical grid is provided. The line angle shift controller includes a line angle shift controller configured to receive a phase locked loop (PLL) error signal representative of a difference between a phase angle of the power generation system and a phase angle of the electrical grid, receive a threshold phase from the electrical grid, and generate a PLL shift signal based at least partially on the PLL error signal and the threshold phase.

In another aspect, a synchronizing system for controlling operation of a power conversion assembly of a power generation system coupled to an electrical grid is provided. The synchronizing system includes a phase locked loop (PLL) configured to receive a threshold phase from an electrical grid, generate a PLL phase angle signal, and generate a PLL error signal representative of a difference between a phase angle of the power generation system and a phase angle of the electrical grid. The synchronizing system also includes a line angle shift logic circuit configured to receive the PLL error signal and generate a PLL shift signal based at least partially on the PLL error signal. The synchronizing system also includes a summing junction configured to add the PLL phase angle signal and the PLL shift signal to produce a line converter angle reference signal. The synchronizing system also includes a controller configured to generate a plurality of line converter control signals based on the line converter angle reference signal and transmit the line converter control signals to the power conversion assembly.

In yet another aspect, a method for controlling operation of a power generation system connected to an electrical grid is provided. The power generation system includes an electrical generator, a power converter and a controller. The method includes monitoring an output parameter of the power generation system indicative of a difference between a phase of the electrical grid and a phase of the output of the power generation system. The method also includes generating, using the controller, a command signal based at least partially on the output parameter. The method further includes controlling an operation of the power converter based at least partially on the command signal to align the output phase of the power generation system with the phase of the electrical grid.

DETAILED DESCRIPTION OF THE INVENTION

Figure 1:
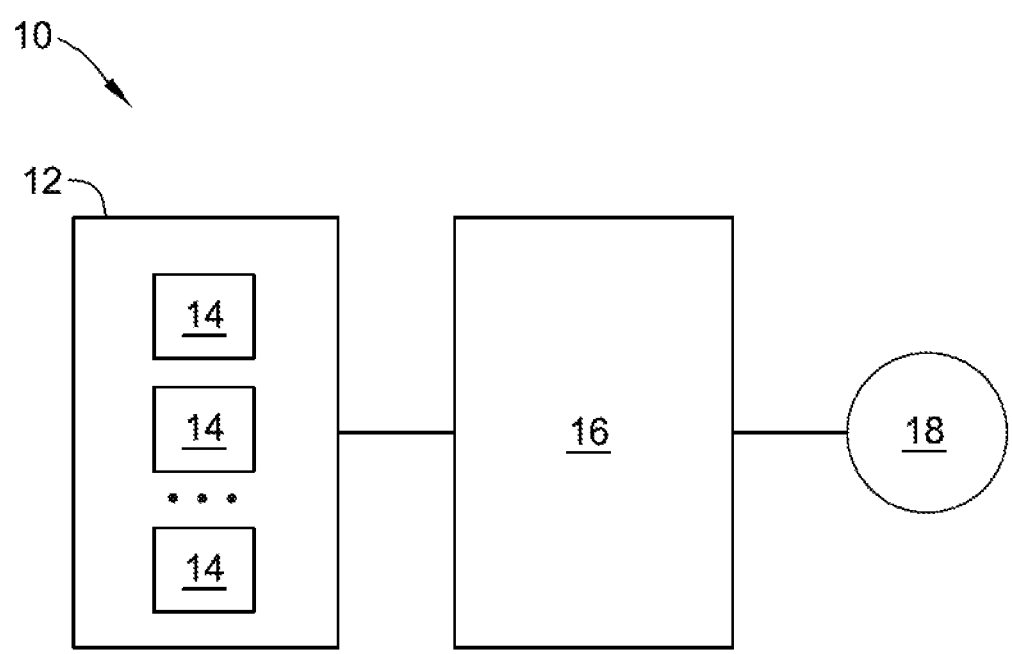
FIG. 1 is a block diagram of an exemplary power generation system having a power generator.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) monitoring an output parameter of the power generation and delivery system indicative of the angle of the phase of the electrical grid versus the angle of the output phase of the system; (b) generating, using a controller, a command signal based at least partially on the output parameter; and, (c) controlling operation of the power converter based at least partially on the command signal to align the phase of the output of the system with an electrical grid.

The methods, systems, and computer readable media described herein facilitate aligning the output phase of a power generation and delivery system to an electrical grid during recovery from a grid contingency event in a grid having weak AC transmission that results in large phase tracking error.

As described herein, a synchronizing system for controlling operation of a power conversion assembly generates a line converter angle reference signal to facilitate bringing the power conversion assembly output in phase with the electrical grid. The synchronizing system includes a phase locked loop (PLL) configured to receive an AC terminal voltage from an electrical grid, generate a PLL phase angle signal, and generate a PLL error signal. The PLL phase angle signal is a reference for the controls within the converter systems, which tracks the phase of the electrical grid. Specifically, if a monitoring function were utilized to create sine wave signals from this PLL phase angle signal, these sine wave signals would line up in phase with the corresponding AC voltage signals existing on the electrical grid. The PLL phase error signal is the difference between the phase angle signal and the corresponding phase associated with the AC voltage signals existing on the grid.

The synchronizing system also includes a line angle shift logic configured to receive the PLL error signal and generate a PLL shift signal based at least partially on the PLL error signal. A summing junction is configured to add the PLL phase angle signal and the PLL shift signal to produce a line converter angle reference signal. A converter interface controller is configured to generate line converter control signals based on the line converter angle reference signal and transmit the line converter control signals to the power converter. Controlling the line converter output of the power converter as a function of the PLL error facilitates reducing system oscillations that may occur during recovery from a grid contingency event. Furthermore, reducing system oscillations stabilizes the power generation system and electrical grid. Although generally described herein with respect to a wind turbine, the methods and systems described herein are applicable to any type of electric generation system including, for example, solar power generation systems, fuel cells, geothermal generators, hydropower generators, and/or other devices that generate power from renewable and/or non-renewable energy sources.

FIG. 1 is a block diagram of an exemplary power generation system 10 that includes a power generator 12. Power generator 12 includes one or more power generation units 14. Power generation units 14 may include, for example, wind turbines, solar cells, fuel cells, geothermal generators, hydropower generators, and/or other devices that generate power from renewable and/or non-renewable energy sources. Although three power generation units 14 are shown in the exemplary embodiment, in other embodiments, power generator 12 may include any suitable number of power generation units 14, including only one power generation unit 14.

In the exemplary embodiment, power generator 12 is coupled to a power converter 16 that is configured to convert a substantially direct current (DC) power output from power generator 12 to alternating current (AC) power. The AC power is transmitted to an electrical distribution network 18, or "grid." Power converter 16, in the exemplary embodiment, adjusts an amplitude of the voltage and/or current of the converted AC power to an amplitude suitable for electrical distribution network 18, and provides AC power at a frequency and a phase that are substantially equal to the frequency and phase of electrical distribution network 18. Moreover, in the exemplary embodiment, power converter 16 is configured to provide three phase AC power to electrical distribution network 18. Alternatively, power converter 16 can provide single phase AC power or any other number of phases of AC power to electrical distribution network 18. Furthermore, in some embodiments, power generation system 10 may include more than one power converter 16. For example, in some embodiments, each power generation unit 14 may be coupled to a separate power converter 16.

In the exemplary embodiment, power generation units 14 include one or more wind turbines 20 (shown in FIG. 2) coupled to facilitate operating power generation system 10 at a desired power output. Each wind turbine 20 is configured to generate substantially direct current power. Wind turbines 20 are coupled to power converter 16, or power converter system 16, that converts the DC power to AC power that is transmitted to the electrical distribution network 18. Methods and systems will be further described herein with reference to such a wind turbine based power generation system. However, the methods and systems described herein are applicable to any type of electric generation system.

In other embodiments, power generation units 14 include solar panels (not shown) coupled to form one or more solar arrays (not shown) to facilitate operating power generation system 10 at a desired power output. Each power generation unit 14 may be an individual solar panel or an array of solar panels. In one embodiment, power generation unit 14 includes a plurality of solar panels and/or solar arrays coupled together in a series-parallel configuration to facilitate generating a desired current and/or voltage output from power generation system 10. Solar panels include, in one embodiment, one or more of a photovoltaic panel, a solar thermal collector, or any other device that converts solar energy to electrical energy. Moreover, each solar panel is a photovoltaic panel that generates a substantially direct current power as a result of solar energy striking solar panels. The solar array is coupled to power converter 16 that converts the DC power to alternating current power that is transmitted to electrical distribution network 18.

Figure 2:
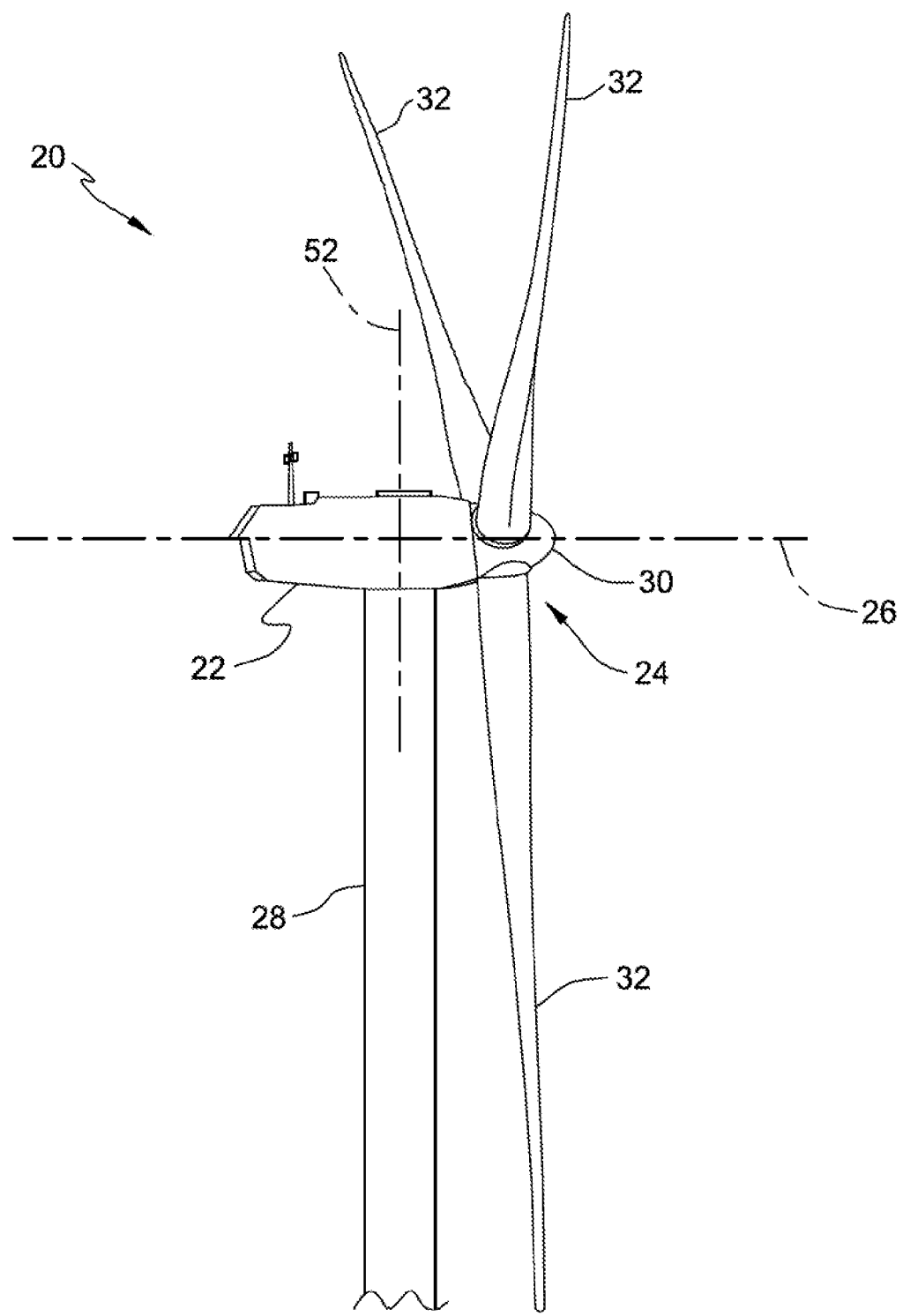
FIG. 2 is a perspective view of a portion of an exemplary wind turbine that may be used in the power generation system shown in FIG. 1.
Figure 3:
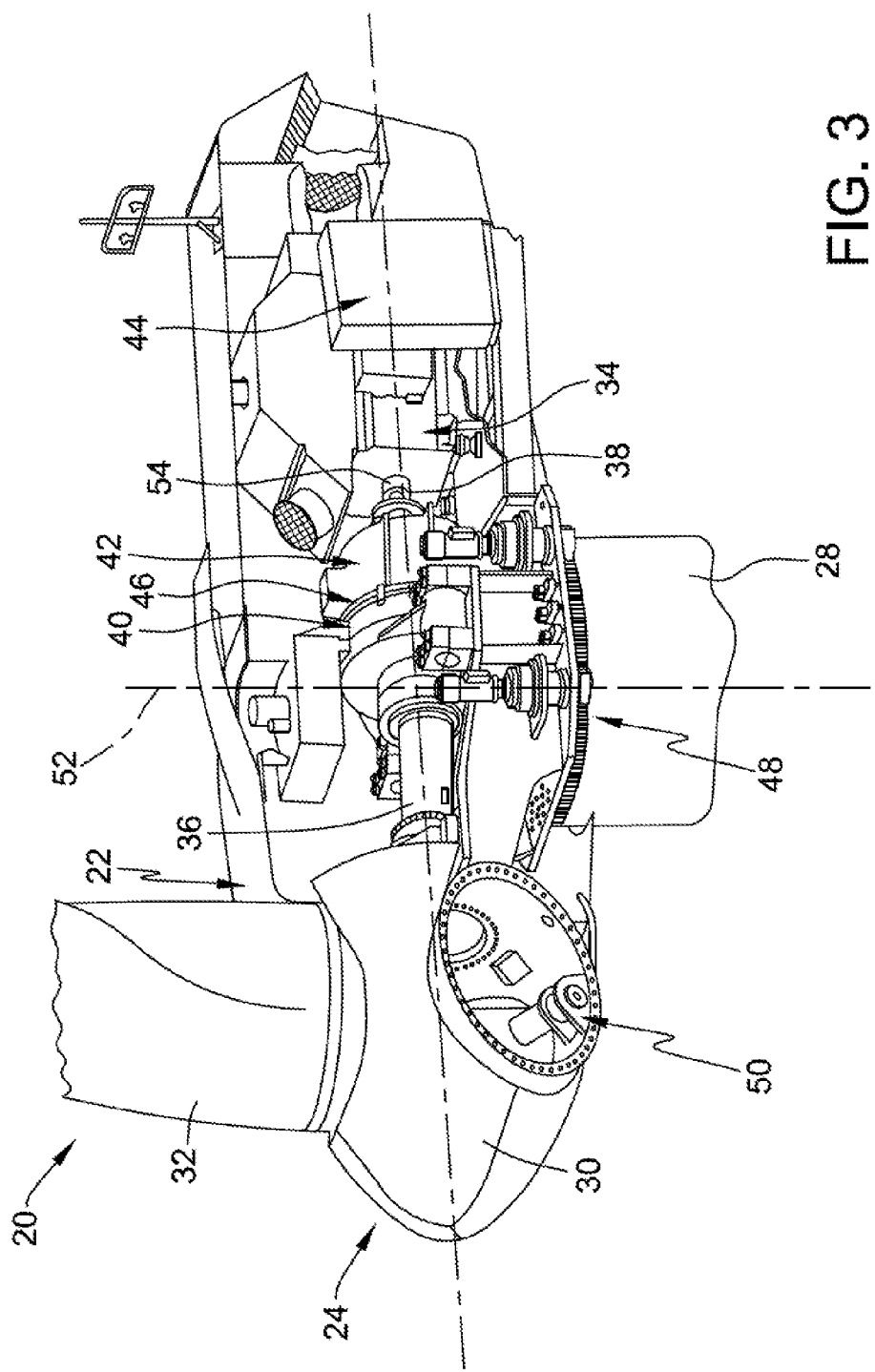
FIG. 3 is a partially cut-away view of a portion of the wind turbine shown in FIG. 2.

FIG. 2 is a perspective view of wind turbine 20 (e.g., a horizontal axis wind turbine) that may be used in power generation system 10. FIG. 3 is a partially cut-away perspective view of a portion of wind turbine 20. Wind turbine 20 described and shown herein is a wind turbine generator for generating electrical power from wind energy. Moreover, wind turbine 20 described and illustrated herein includes a horizontal-axis configuration. However, in some embodiments, wind turbine 20 may include, in addition or alternative to the horizontal-axis configuration, a vertical-axis configuration (not shown). Wind turbine 20 may be coupled to grid 18 (shown in FIG. 1), for receiving electrical power therefrom to drive operation of wind turbine 20 and/or its associated components and/or for supplying electrical power generated by wind turbine 20 thereto. Although only one wind turbine 20 is shown in FIGS. 2 and 3, in some embodiments, a plurality of wind turbines 20 may be grouped together, sometimes referred to as a "wind farm."

Wind turbine 20 includes a body or nacelle 22 and a rotor (generally designated by 24) coupled to nacelle 22 for rotation with respect to nacelle 22 about an axis of rotation 52. In the exemplary embodiment, nacelle 22 is mounted on a tower 28. However, in some embodiments, in addition or alternative to tower-mounted nacelle 22, nacelle 22 may be positioned adjacent the ground (not shown) and/or a surface of water (not shown). The height of tower 28 may be any suitable height enabling wind turbine 20 to function as described herein. Rotor 24 includes a hub 30 and a plurality of blades 32 (sometimes referred to as "airfoils") extending radially outwardly from hub 30 for converting wind energy into rotational energy. Although rotor 24 is described and illustrated herein as having three blades 32, rotor 24 may have any number of blades 32. Blades 32 may each have any length that allows wind turbine 20 to function as described herein. For example, in some embodiments, one or more rotor blades 32 are about one-half meter long, while in some embodiments one or more rotor blades 32 are about fifty meters long. Other examples of blade lengths include ten meters or less, about twenty meters, about thirty-seven meters, and about forty meters. Still other examples include rotor blades between about fifty and about one-hundred meters long, and rotor blades greater than one-hundred meters long.

Despite how rotor blades 32 are illustrated in FIG. 2, rotor 24 may have blades 32 of any shape, and may have blades 32 of any type and/or any configuration, whether such shape, type, and/or configuration is described and/or illustrated herein. One example of another type, shape, and/or configuration of blades 32 is a Darrieus wind turbine, sometimes referred to as an "eggbeater" turbine. Yet another example of another type, shape, and/or configuration of blades 32 is a Savonious wind turbine. Moreover, wind turbine 20 may, in some embodiments, be a wind turbine wherein rotor 24 generally faces upwind to harness wind energy, and/or may be a wind turbine wherein rotor 24 generally faces downwind to harness energy. Of course, in any of the embodiments, rotor 24 may not face exactly upwind and/or downwind, but may face generally at any angle (which may be variable) with respect to a direction of the wind to harness energy therefrom.

Wind turbine 20 includes an electrical generator 34 coupled to rotor 24 for generating electrical power from the rotational energy generated by rotor 24. Generator 34 may be any suitable type of electrical generator, such as, but not limited to, a wound rotor induction generator, a double-fed induction generator (DFG, also known as a dual-fed asynchronous generator), a permanent magnet (PM) synchronous generator, an electrically-excited synchronous generator, and a switched reluctance generator. Generator 34 includes a stator (not shown) and a rotor (not shown) with an air gap included therebetween. Rotor 24 includes a rotor shaft 36 coupled to rotor hub 30 for rotation therewith. Generator 34 is coupled to rotor shaft 36 such that rotation of rotor shaft 36 drives rotation of the generator rotor, and therefore operation of generator 34. In the exemplary embodiment, generator 34 includes a generator shaft 38 coupled thereto and coupled to rotor shaft 36 such that rotation of rotor shaft 36 drives rotation of the generator rotor. In other embodiments, the generator rotor is directly coupled to rotor shaft 36, sometimes referred to as a "direct-drive wind turbine." In the exemplary embodiment, generator shaft 38 is coupled to rotor shaft 36 through a gearbox 40, although in other embodiments generator shaft 38 is coupled directly to rotor shaft 36.

The torque of rotor 24 drives the generator rotor to generate variable frequency AC electrical power from rotation of rotor 24. Generator 34 has an air gap torque between the generator rotor and stator that opposes the torque of rotor 24. A power conversion assembly 42 is coupled to generator 34 for converting the variable frequency AC to a fixed frequency AC for delivery to an electrical load (not shown), such as, but not limited to electrical grid 18 (shown in FIG. 1), coupled to generator 34. Power conversion assembly 42 may include a single frequency converter or a plurality of frequency converters configured to convert electricity generated by generator 34 to electricity suitable for delivery over the power grid. Power conversion assembly 42 may also be referred to herein as a power converter. Power conversion assembly 42 may be located anywhere within or remote to wind turbine 20. For example, power conversion assembly 42 may be located within a base (not shown) of tower 28.

In the exemplary embodiment, wind turbine 20 includes at least one system controller 44 coupled to at least one component of wind turbine 20 for generally controlling operation of wind turbine 20 and/or controlling operation of the components thereof. For example, system controller 44 may be configured to control operation of power conversion assembly 42, a disk brake 46, a yaw system 48, and/or a variable blade pitch system 50. Disk brake 46 brakes rotation of rotor 24 to, for example, slow rotation of rotor 24, brake rotor 24 against full wind torque, and/or reduce the generation of electrical power from electrical generator 34. Yaw system 48 rotates nacelle 22 about an axis of rotation 52 for changing a yaw of rotor 24, and more specifically for changing a direction faced by rotor 24 to, for example, adjust an angle between the direction faced by rotor 24 and a direction of wind.

Furthermore, variable blade pitch system 50 controls, including but not limited to changing, a pitch angle of blades 32 (shown in FIGS. 2-3) with respect to a wind direction. Pitch system 50 may be coupled to system controller 44 for control thereby. Pitch system 50 is coupled to hub 30 and blades 32 for changing the pitch angle of blades 32 by rotating blades 32 with respect to hub 30. Pitch system 50 may include any suitable structure, configuration, arrangement, means, and/or components, whether described and/or shown herein, such as, but not limited to, electrical motors, hydraulic cylinders, springs, and/or servomechanisms. Moreover, pitch system 50 may be driven by any suitable means, whether described and/or shown herein, such as, but not limited to, hydraulic fluid, electrical power, electro-chemical power, and/or mechanical power, such as, but not limited to, spring force.

Figure 4:
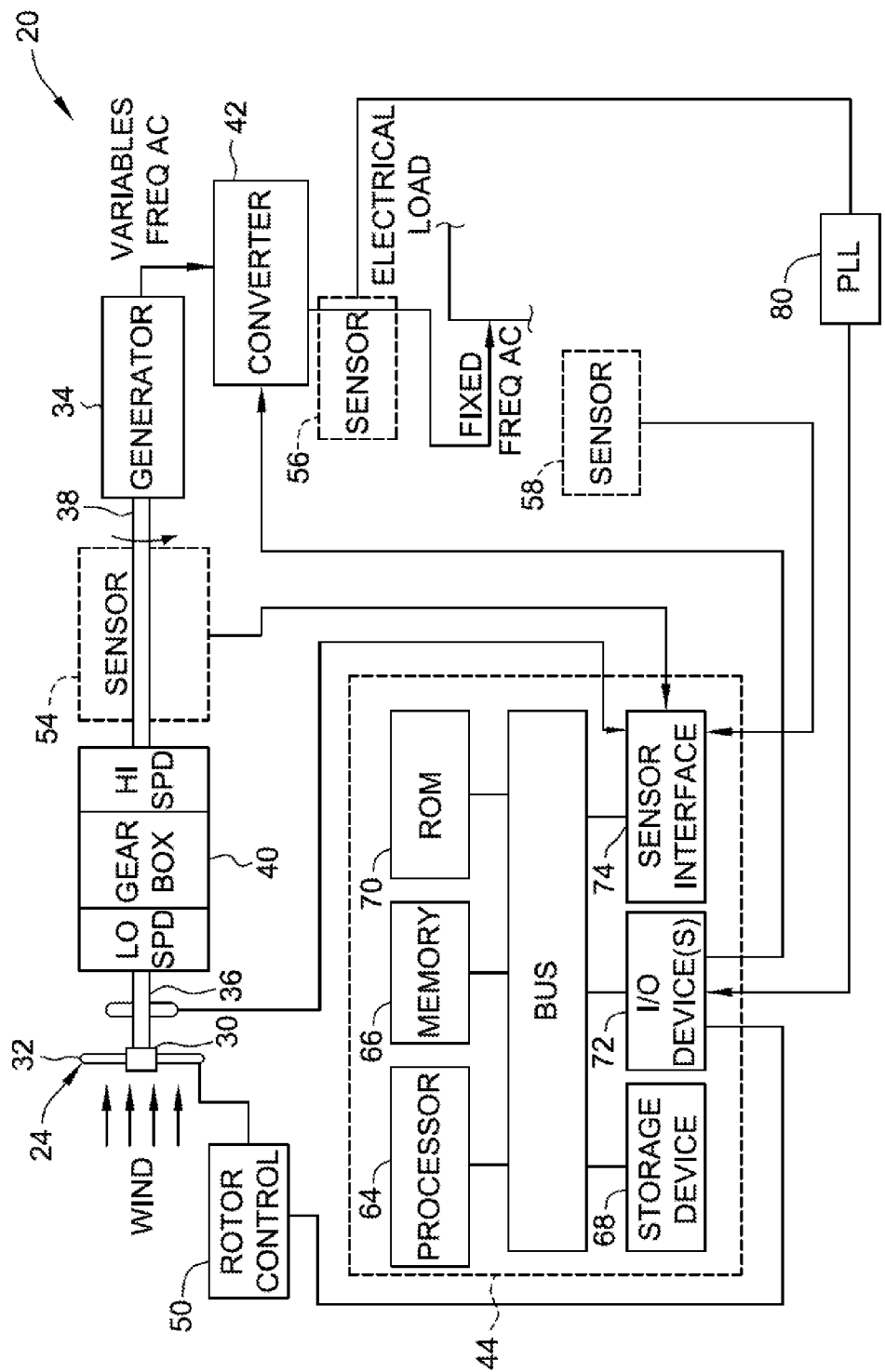
FIG. 4 is a block diagram of the wind turbine shown in FIG. 2.

FIG. 4 is a block diagram of wind turbine 20. In the exemplary embodiment, wind turbine 20 includes one or more system controllers 44 coupled to at least one component of wind turbine 20 for generally controlling operation of wind turbine 20 and/or controlling operation of the components thereof, regardless of whether such components are described and/or shown herein. For example, in the exemplary embodiment system controller 44 is coupled to pitch system 50 for generally controlling rotor 24. In the exemplary embodiment, system controller 44 is mounted within nacelle 22 (shown in FIG. 3), however, additionally or alternatively, one or more system controllers 44 may be remote from nacelle 22 and/or other components of wind turbine 20. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In the exemplary embodiment, wind turbine 20 includes a plurality of sensors, for example, sensors 54, 56, and 58. Sensors 54, 56, and 58 are configured to measure a variety of parameters including, without limitation, operating conditions and atmospheric conditions. Each sensor 54, 56, and 58 may be an individual sensor or may include a plurality of sensors. Sensors 54, 56, and 58 may be any suitable sensor having any suitable location within or remote to wind turbine 20 that allows wind turbine 20 to function as described herein. In some embodiments, sensors 54, 56, and 58 are coupled to system controller 44 for transmitting measurements to system controller 44 for processing thereof.

In some embodiments, system controller 44 includes a bus 62 or other communications device to facilitate communicating. One or more processor(s) 64 are coupled to bus 62 to process information, including information from sensors 54, 56, 58 and/or other sensor(s). Processor(s) 64 may include at least one computer (not shown). As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 is configured to process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface (not shown) such as a mouse and a keyboard. Alternatively, other computer peripherals may also be used that may include, for example, a scanner (not shown). Furthermore, in the exemplary embodiment, additional output channels may include, for example, an operator interface monitor (not shown in FIG. 4). System controller 44 may also include a sensor interface 74 that allows system controller 44 to communicate with sensors 54, 56, 58 and/or other sensor(s). Sensor interface 74 may include one or more analog-to-digital converters (not shown) that convert analog signals into digital signals that can be used by processor(s) 64.

In the exemplary embodiment, wind turbine 20 includes a phase locked loop (PLL) regulator 80 coupled to sensor 56. In the exemplary embodiment, sensor 56 is a voltage transducer configured to measure a terminal grid voltage output by power conversion assembly 42. Alternatively, PLL regulator 80 is configured to receive a plurality of voltage measurement signals from a plurality of voltage transducers. In an example of a three-phase generator, each of three voltage transducers is electrically coupled to each one of three phases of a grid bus. PLL regulator 80 may be configured to receive any number of voltage measurement signals from any number of voltage transducers that allow PLL regulator 80 to function as described herein.

Figure 5:
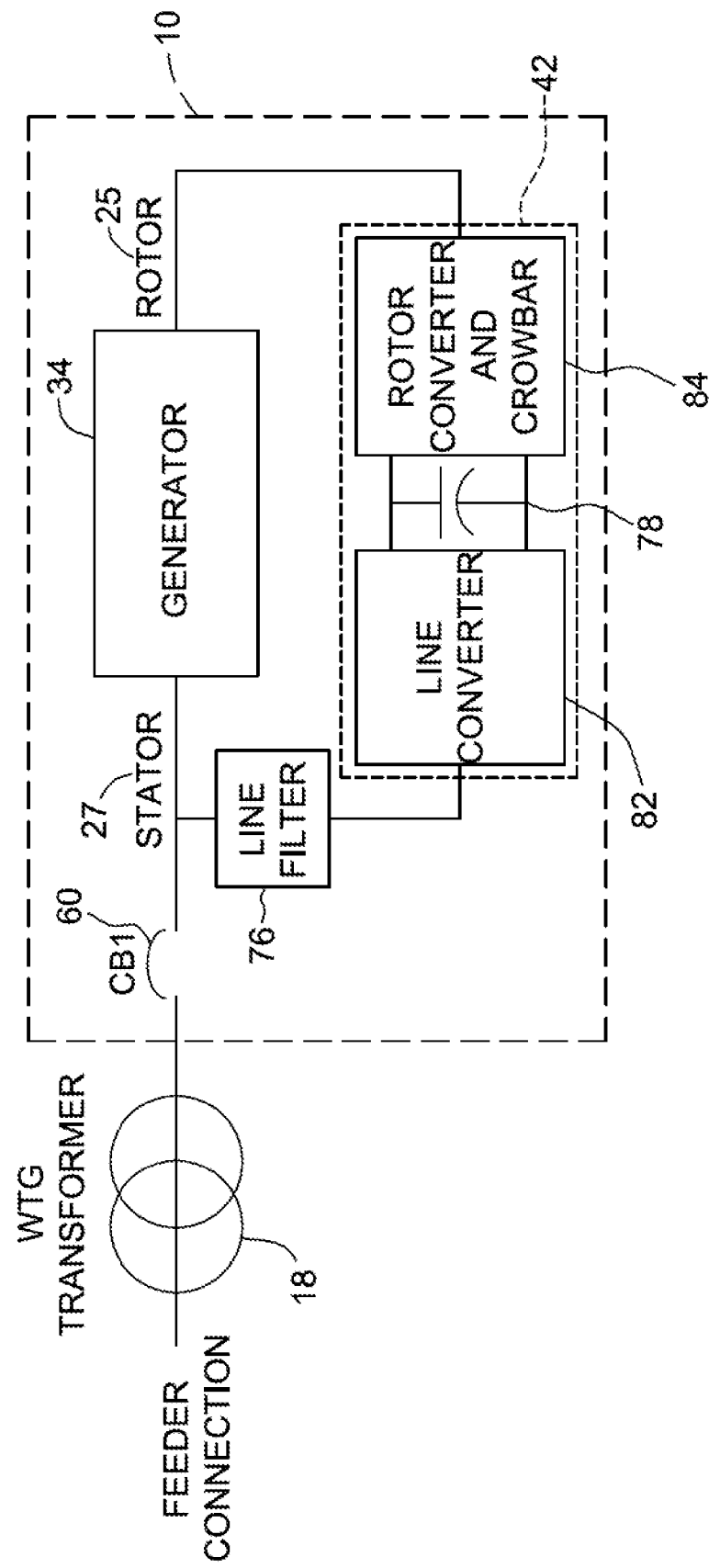
FIG. 5 is a block diagram of the power generation and delivery system that may include the wind turbine shown in FIG. 2.

FIG. 5 is a block diagram of power generator system 10 having a power generator, specifically a wind turbine generation system employing wind turbine 20 (shown in FIG. 2). In the exemplary embodiment, generator 36 includes a rotor 25 and a stator 27. Electricity generated at rotor 25 is asynchronous to grid 136 (shown in FIG. 6), in that the speed of the rotor shaft 36 (shown in FIG. 7) is at least partially controlled by the wind speed. In order to synchronize the rotor voltage and current to grid 136, power conversion assembly 42 having a back to back line converter 82 and rotor converter firing controller 84 connected by DC link 78 is employed. System 10 has a plurality of protection systems designed to react directly to grid (e.g., over- and undervoltage) events, for example, tripping circuit breaker 60. Rotor converter firing controller 84 additionally includes a "crowbar" function, according to an embodiment, which is configured to short the rotor circuit and isolates DC link 78 in the event of a severe fault located close to system 10.

Figure 6:
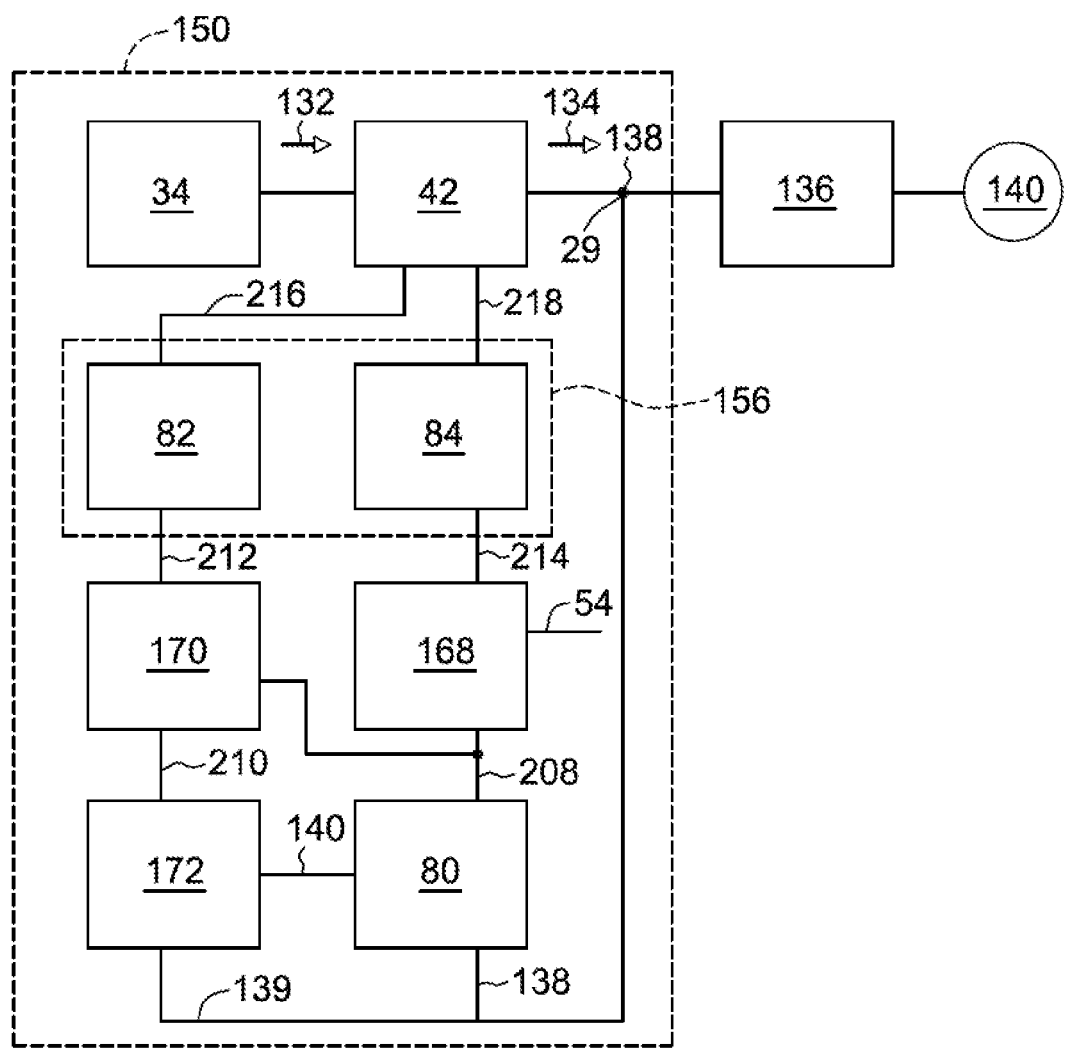
FIG. 6 is a block diagram of an exemplary converter control system that may be included within the power generation and delivery system shown in FIG. 5.

FIG. 6 is a block diagram of an exemplary power generation and delivery system 150. Power generation and delivery system 150 may be used with, or included within, wind turbine 20 (shown in FIGS. 2 and 3). System 150 includes an energy source, for example, generator 34. Although described herein as wind turbine generator 34, the energy source may include any type of electrical generator that allows system 150 to function as described herein (e.g., a solar power generation system). System 150 also includes a power converter, such as, power conversion assembly 42. Power conversion assembly 42 receives electrical power (Pv) 132 generated by generator 34 and converts electrical power 132 to an electrical power (Pt) 134 (referred to herein as terminal power 134) suitable for transmission over an electric power transmission and distribution grid 136 (referred to herein as electrical grid 136). A terminal voltage (Vt) 138 is defined at a node 29 between power conversion assembly 42 and electrical grid 136. A bulk power system 140 is coupled to electrical grid 136. Bulk power system 140 includes a plurality of loads and/or power sources. Converter interface controller 156 includes line converter firing controller 82 and rotor converter firing controller 84. Converter interface controller 156 is configured to interface with power conversion assembly 42 to relay control signals such as line converter control signal 216 for controlling the phase of the line voltage (e.g., terminal voltage) and current and rotor converter control signal 218 for controlling the phase of the rotor voltage and current.

A grid contingency event (i.e., grid event), may leave electrical grid 136 in a degraded mode where the grid impedance is high. An example of a grid event includes a short-circuit fault on one of the transmission lines (not shown) within electrical grid 136. Electrical transmission protection actions remove the faulted portion of electrical grid 136 to permit operation of the remaining unfaulted portion of electrical grid 136. A transmission path remains that is degraded in its ability to transmit power from system 150 to bulk power system 140. Such grid events cause a brief period of low voltage on electrical grid 136 prior to clearing the faulted portion of electrical grid 136. Typically, terminal voltage 138 will be significantly degraded at the time of the grid event, potentially resulting in a high PLL error signal 190.

Another example of a grid event includes a weak grid condition. Phase control of power generation system 150 is based on the concept that measured grid voltage waveforms have a fixed frequency and magnitude and that the injection of power from the power generation system 150 into grid 136 is such that it does not affect the phase of the measured grid voltage waveforms. Power generation system 150 is configured to inject power into grid 136 so that the power is in phase with the measured fundamental voltage waveforms. In locations remote from sources of power generation sources, the strength of the grid voltage waveforms is reduced. In these situations, the output of power generation systems 10 has a significant impact on the grid voltage and frequency that is measured by the power generation system 150.

Line converter firing controller 82 is configured to phase track using a measure of PLL phase error (referred to as the PLL error signal 190) and measured generator voltage (referred to as AC terminal voltage) to add PLL shift signal 210 to the PLL phase angle signal 208 used by line converter firing controller 82 to align its output with the phase of electrical grid 136. Phase tracking maintains DC voltage within the allowed operating range when grid transients cause the PLL regulator 80 to produce a large phase error. Such large phase errors are particularly observed for remote faults (e.g., grid events) in a grid having weak AC transmission.

Figure 7:
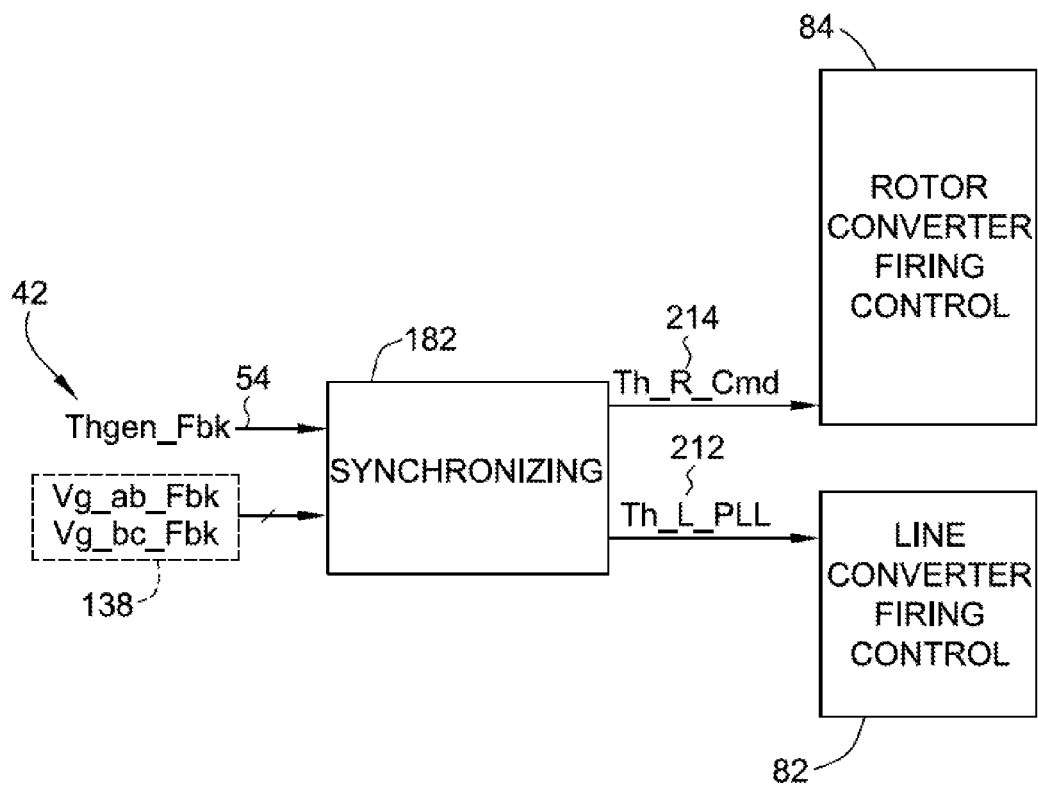
FIG. 7 is a schematic block diagram of an exemplary power converter.

FIG. 7 is a schematic block diagram of power converter 42. Power converter 42 includes synchronizing system 182 for synchronizing the output of line converter firing controller 82 to the phase of electrical grid 136. Input signals originate from sensors 54, 56, 58 (shown in FIG. 4) within, for example, the power generator 12.

Figure 8:
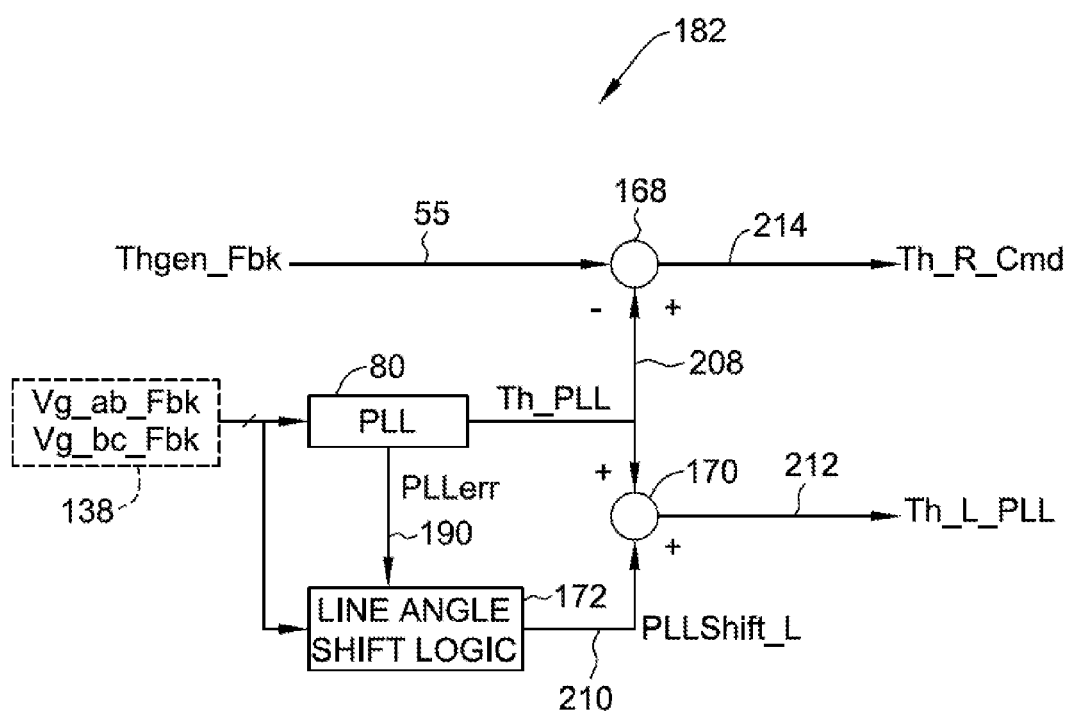
FIG. 8 is a schematic block diagram of an exemplary synchronizing system of the power converter shown in FIG. 7.

FIG. 8 is a schematic block diagram of synchronizing system 182 of power converter 42 (shown in FIG. 7). In the exemplary embodiment, synchronizing system 182 includes line angle shift logic 172 which is configured to facilitate comparing PLL error signal 190 to a threshold and outputs an analog signal, such as PLL shift signal 210, based upon that comparison. For example, when the error is between the upper limit of a threshold and the lower limit of a threshold, PLL shift signal 210 is set to zero. By setting PLL shift signal 210 to zero, no additional phase shifting is performed to PLL phase angle signal 208 used by line converter firing controller 82 (shown in FIG. 7) to align the output of system 150 with the phase of grid 136. When PLL error signal 190 is outside the bounds defined by the threshold, then PLL shift signal 210 is set to a function of PLL error signal 190 in order to facilitate shifting PLL phase angle signal 208 used by line converter firing controller 82 (shown in FIG. 7) to align its output with the phase of grid 136.

PLL regulator 80 is configured to receive terminal voltage 138 and to generate PLL error signal 190, representative of a difference between a phase angle of the power generation system 150 and a phase angle of grid 136 (shown in FIG. 6), which is received by line angle shift logic 172 (e.g., line angle shift controller, line angle shift logic circuit). Line angle shift logic 172 is configured to receive terminal voltage 138 and compare PLL error signal 190 to a threshold phase. In some applications, the threshold phase may be a function of the measured terminal voltage magnitude.

In the exemplary embodiment, when line angle shift logic 172 compares PLL error signal 190 to the threshold of 10 degrees plus or minus (e.g., the lower threshold is a value equal to 10 degrees below the phase of electrical grid 136 and the upper threshold is a value equal to 10 degrees above the phase of electrical grid 136) the phase angle determined by terminal voltage 138, the result is used to set PLL shift signal 210 value to zero or a function of PLL error signal 190. If PLL error signal 190 is between the upper limit of the threshold and the lower limit of the threshold, then PLL shift signal 210 is set to zero, and no compensation additional to PLL phase angle signal 208 is applied to line converter angle reference signal 212. If PLL error signal 190 is outside the bounds of the threshold, then PLL shift signal 210 is set to some function of PLL error signal 190. Alternately, a function for particular power generation system 150 depends upon elements such as hysteresis, filtering, gains, offsets, and other characteristics in order to adjust PLL phase angle signal 208 (shown in FIG. 6) to facilitate correcting line converter angle reference signal 212 for grid event. According to an exemplary embodiment as shown implemented in FIGS. 9 through 18, the function is a deadband function with hysteresis.

In the exemplary embodiment, line angle shift logic 172 is configured to receive PLL error signal 190, receive terminal voltage 138, and generate PLL shift signal 210 based at least partially on PLL error signal 190 and terminal voltage 138. PLL shift signal 210 is configured to align an output of an electrical generation and distribution system (i.e., power generation system 10) with a phase of electrical grid 136. Line angle shift logic 172 is configured to compare PLL error signal 190 to a predefined threshold. PLL shift signal 210 (shown in FIG. 6) is maintained at a value of zero when PLL error signal 190 is inside the bounds defined by the threshold. PLL shift signal 210 is set to a function of PLL error signal 190 when PLL error signal 190 is outside the bounds defined by the threshold. In the exemplary embodiment, the threshold values are about plus or minus ten degrees of the phase of electrical grid 136 (shown in FIG. 6). Alternately, threshold values may be about plus or minus 20 degrees of the phase of electrical grid 136.

Synchronizing system 182 is configured to receive terminal voltage 138 from electrical grid 136, generate PLL phase angle signal 208, and generate PLL error signal 190. Line angle shift logic 172 is configured to receive PLL error signal 190 and generate PLL shift signal 210 based at least partially on PLL error signal 190. Summing junction 170 is configured to add PLL phase angle signal 208 and PLL shift signal 210 to generate line converter angle reference signal 212. Converter interface controller 156 (shown in FIG. 6) is configured to generate line converter control signals 216 (shown in FIG. 6) based at least on the line converter angle reference signal 212 and transmit line converter control signals 216 to power conversion assembly 42. Moreover, line angle shift logic 172 is configured to compare PLL error signal 190 with a threshold.

In the exemplary embodiment, line converter control signals 216 are configured to bring output of power conversion assembly 42 in phase with electrical grid 136. Line angle shift logic is configured to receive terminal voltage 138 and generate PLL shift signal 210 based at least partially on terminal voltage 138. Line converter angle reference signal 212 is configured to maintain the output phase of system 150 when PLL error signal 190 is inside the predefined threshold. Line converter angle reference signal 212 is configured to change the output phase of system 150 from a first phase to a second phase that matches the phase of electrical grid 136 when PLL error signal 190 falls outside the predefined threshold. Moreover, line converter angle reference signal 212, when provided to converter interface controller 156 (shown in FIG. 6), is configured to control operation of power conversion assembly 42 (shown in FIG. 6) of system 150, reducing the phase difference between the output of system 150 and the phase of electrical grid 136.

In the exemplary embodiment, rotor angle position sensor 54 (shown in FIG. 4), which is located on generator shaft 38, is configured to produce a rotor angle position signal 55. Summing junction 168 is configured to subtract rotor angle position signal 55 from PLL phase angle signal 208 to produce rotor converter angle reference signal 214. Converter interface controller 156 is configured to generate rotor converter control signals 218 based on rotor converter angle reference signal 214 and transmit the rotor converter control signals 218 (shown in FIG. 6) to power conversion assembly 42. Rotor converter control signals 218 are configured to facilitate synchronizing the output of power conversion assembly 42 in phase with electrical grid 136.

FIGS. 9 through 18 are graphical views illustrating operation of power generation and delivery system 150 after a grid contingency event. More specifically, FIGS. 9, 11, 13, 15, and 17 illustrate operation of a power generation and delivery system 150 that does not include a synchronizing system, for example, synchronizing system 182 (shown in FIG. 6). Moreover, FIGS. 10, 12, 14, 16, and 18 illustrate operation of a power generation and delivery system 150 (shown in FIG. 6), that includes synchronizing system 182. The exemplary measurements illustrated in FIGS. 9 through 18 were obtained through experimentation and/or calculation and are included to illustrate the effect of operation of synchronizing system 182 on power generation and delivery system 150.

Figure 9:
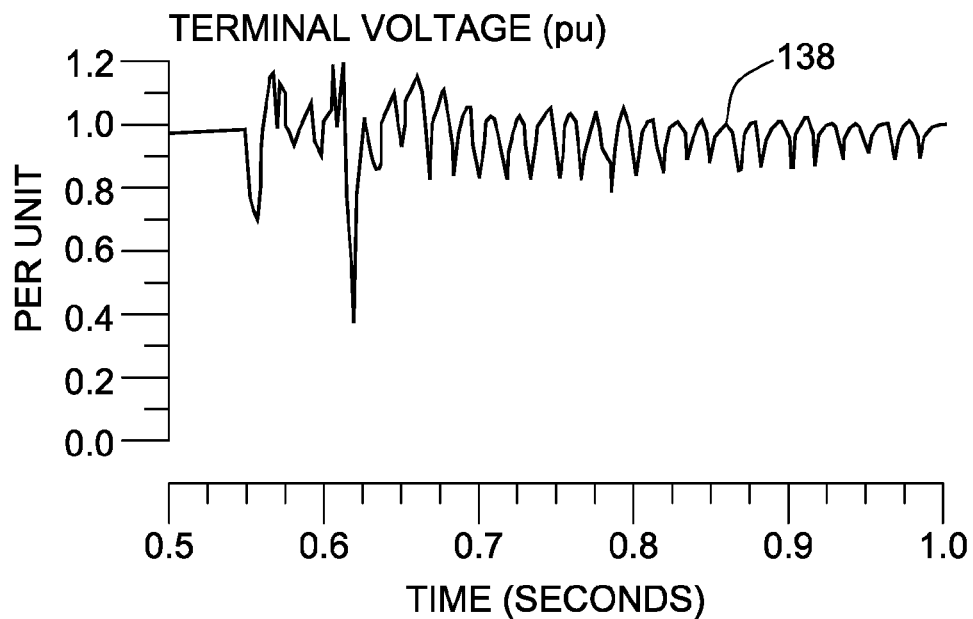
FIGS. 9 through 18 are graphical views illustrating operation of the power generation and delivery system shown in FIG. 5 after a grid contingency event.
Figure 10:
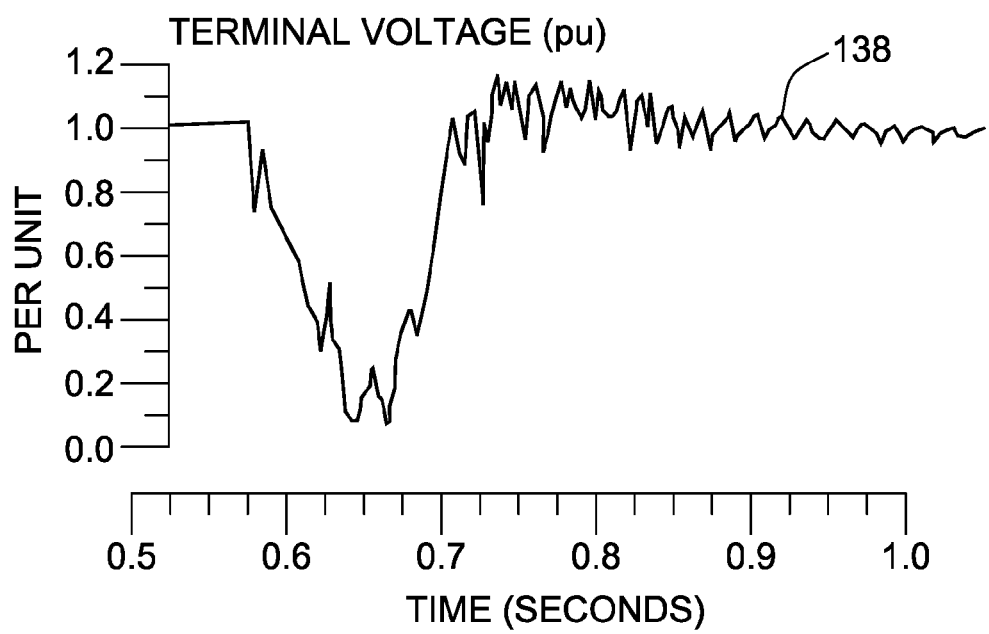

FIGS. 9 and 10 are graphical views of terminal voltage 138 (shown in FIGS. 6 and 7) per unit versus time. In the exemplary example, the oscillation of terminal voltage 138 is an example of a system oscillation that occurs, for example, while system 150 is recovering from grid contingency event. Because the three AC phases of terminal voltage 138 are out of phase, the magnitude of the combined three AC phases is erratic between approximately 0.55 and 0.63 seconds, illustrating the combined instability of the generator output and voltage from electrical grid 136.

FIG. 9 illustrates a system oscillation (e.g., oscillations of terminal voltage 138) increasing over time, until DC Voltage 142 (shown in FIG. 13) causes the circuit breaker 60 (shown in FIG. 5) to trip, taking power generation system 150 offline. The magnitude of terminal voltage 138 after the trip event shows the steady state oscillation of voltage from electric grid 136.

FIG. 10 illustrates the reduction of terminal voltage 138 caused by operation of synchronizing system 182, which is configured to initially reduce the overall magnitude of terminal voltage 138 at the onset of the grid contingency event (e.g., at approximately 0.55 seconds) before allowing the magnitude to return to its normal operating level. More specifically, FIG. 10 illustrates how application of line angle shift logic 172 (shown in FIG. 6) to operation of line converter firing controller 82 (shown in FIG. 5) controls terminal voltage 138. The vertical axis of FIGS. 9 and 10 represents units of voltage which are determined by power generation system 150. For example, if power generation system 150 outputs a voltage of 690 Volts as terminal voltage 138, then one unit on the vertical axis would correspond to 690 Volts. Fractions of that unit, accordingly, correspond to fractions of 690 Volts.

Figure 11:
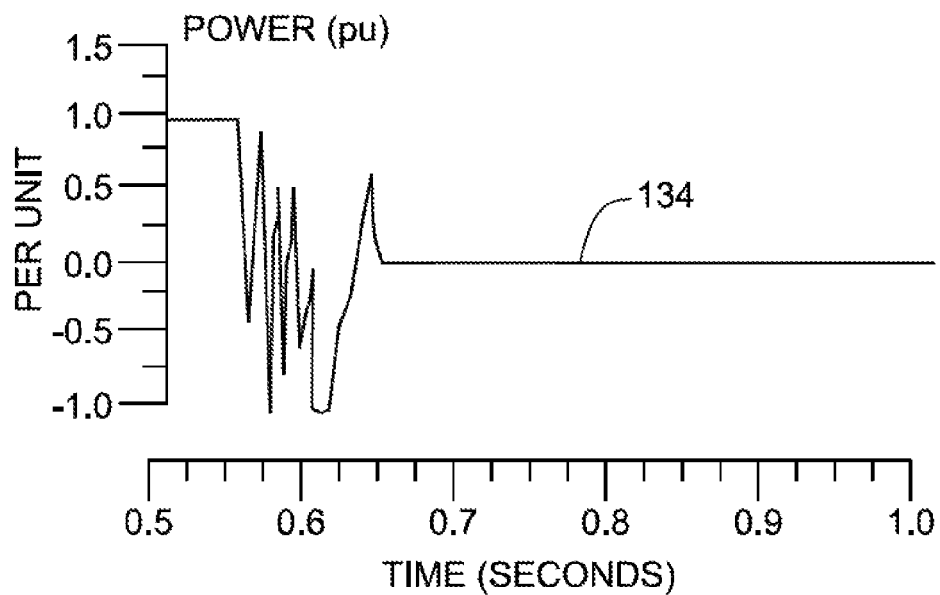
Figure 12:
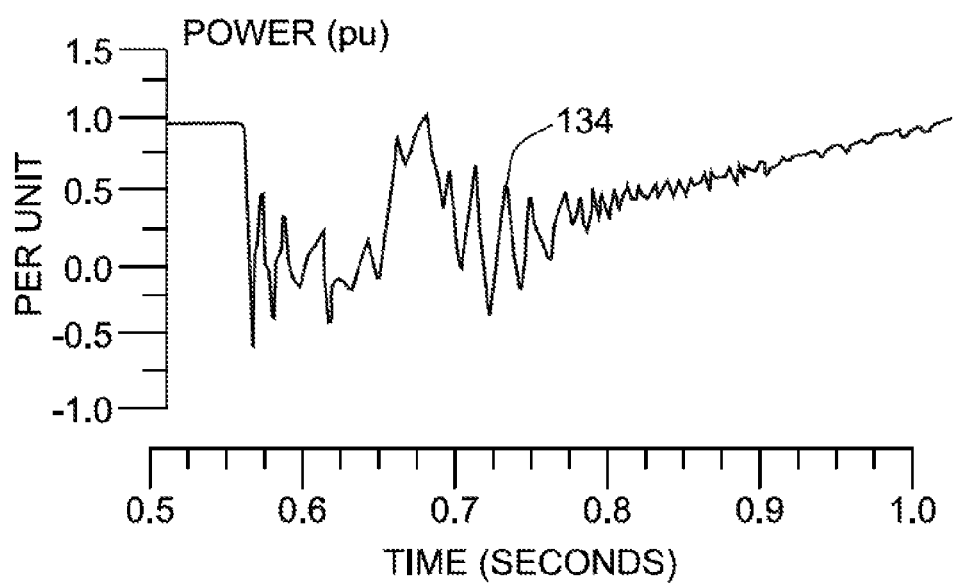

FIGS. 11 and 12 are graphical views of output of electrical power 134 per unit versus time. Initially, it is shown that electrical power 134 at steady state is 1 unit (shown in FIG. 11), which corresponds to the designed output of electrical power 134 of power generation system 150 at steady state. For example, a 1.5 Megawatt power generation system 150 would be outputting 1.5 Megawatts of electrical power 134 at 1 unit. At the time of the grid contingency event, for example at approximately 0.55 seconds, power 134 is shown erratically oscillating until circuit breaker 60 (shown in FIG. 5) trips at approximately 0.63 seconds, eliminating output of electrical power 134 from system 150. Comparatively, FIG. 12 illustrates an initial drop in electrical power 134 output as line angle shift logic 172 (shown in FIG. 6) is configured to correct the out of phase condition caused by the grid contingency event. As line angle shift logic 172 adds PLL shift signal 210 to PLL phase angle signal 208, line converter angle reference signal 212 causes line converter firing controller 82 to align the phase of the output of electrical power 134 with the phase of electrical grid 136 to facilitate increasing the electrical power output from power generation system 150 until it has substantially recovered to its pre-grid contingency event level at approximately 1 second.

Figure 13:
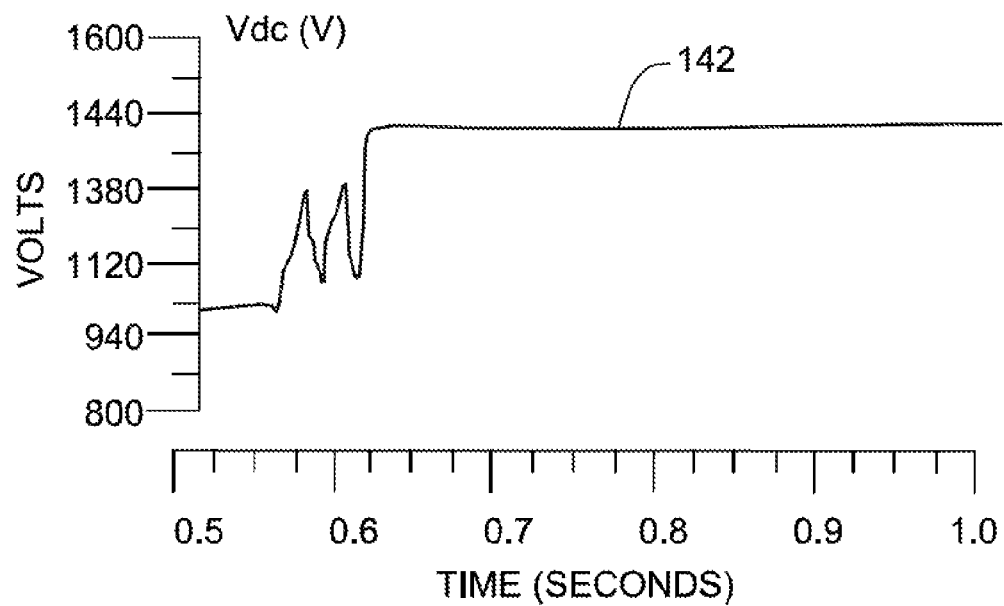
Figure 14:
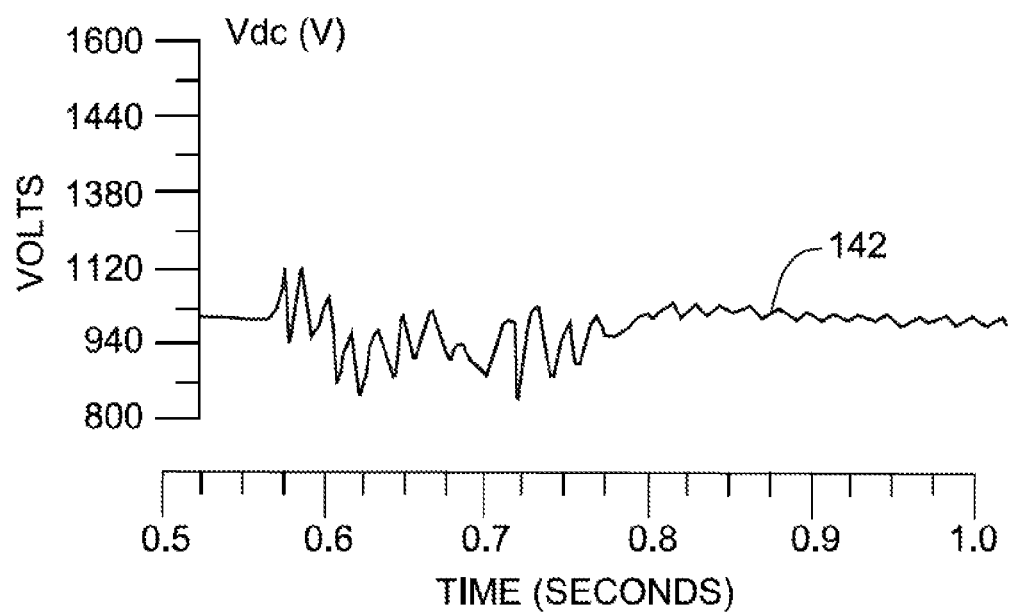

FIGS. 13 and 14 are graphical views of DC voltage 142 across DC link 78 (shown in FIG. 5) in Volts versus time. FIG. 13 illustrates that DC voltage 142 begins to oscillate at the start of the contingency event, and eventually exceeds a predetermined threshold that causes circuit breaker 60 to trip. FIG. 14 illustrates that DC voltage 142 oscillates as line angle shift logic 172 (shown in FIG. 8) controls the output of line converter firing controller 82 (shown in FIG. 5) to facilitate preventing DC voltage 142 from exceeding the trip voltage, thereby allowing DC voltage 142 to stabilize and power generation system 150 to continue operation.

Figure 15:
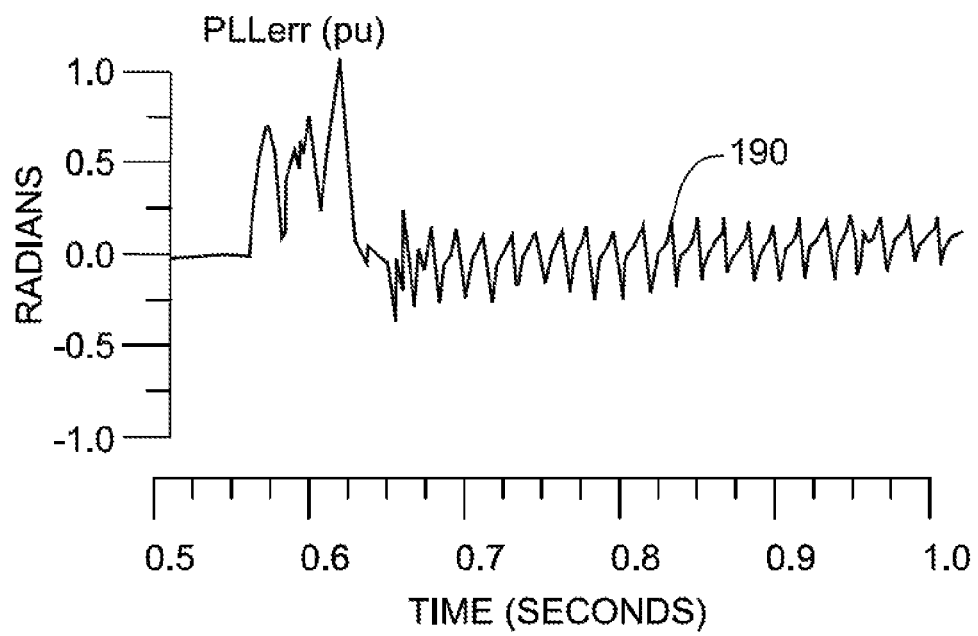
Figure 16:
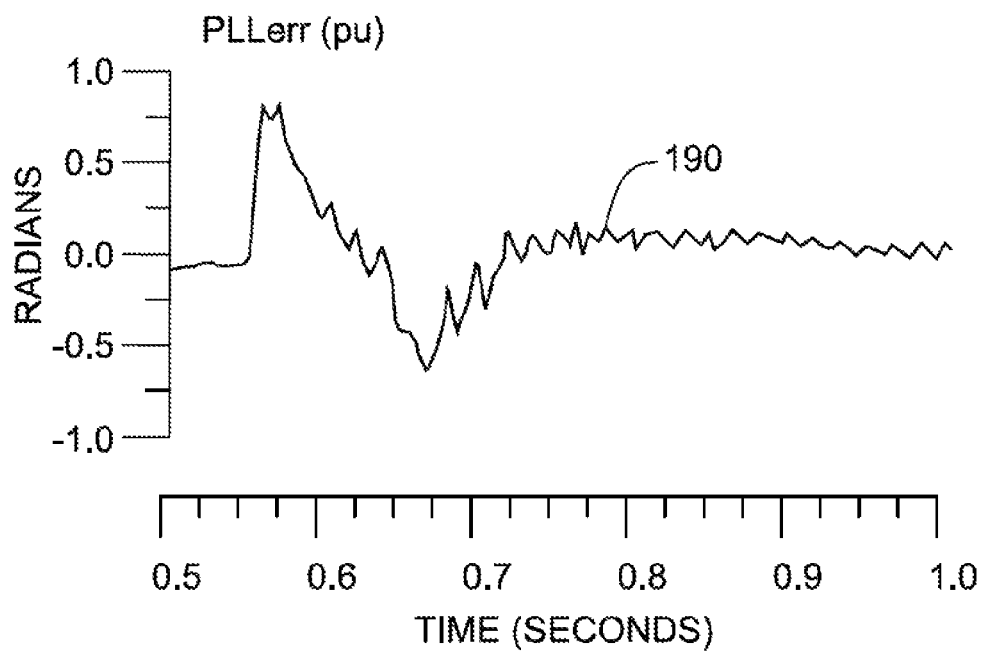

FIGS. 15 and 16 are graphical views of PLL error signal 190 in radians versus time. As described above, after grid contingency event, system oscillations arising from operation of power generation system 150 during a contingency event are represented by PLL error signal 190 (shown in FIG. 8). The phase error between system 150 and electrical grid 136 becomes too high at approximately 0.63 seconds, causing DC voltage 142 (shown in FIG. 13) to exceed a predetermined threshold, causing circuit breaker 60 (shown in FIG. 5) to trip, disabling power output from system 150. FIG. 16 illustrates the reduction in the magnitude of system oscillations, as shown by the reduction in the overall magnitude of PLL error signal oscillations.

Figure 17:
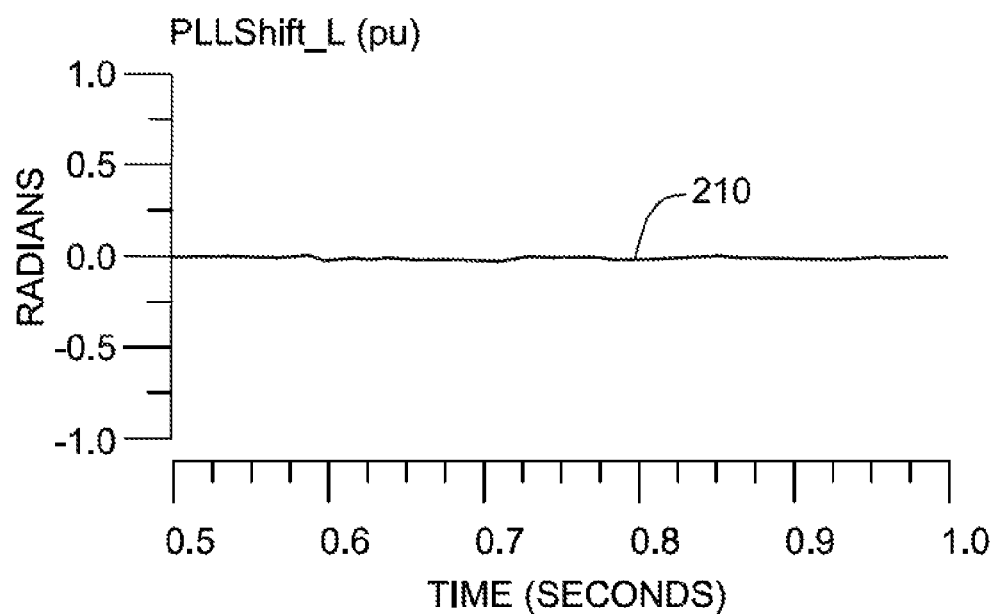
Figure 18:
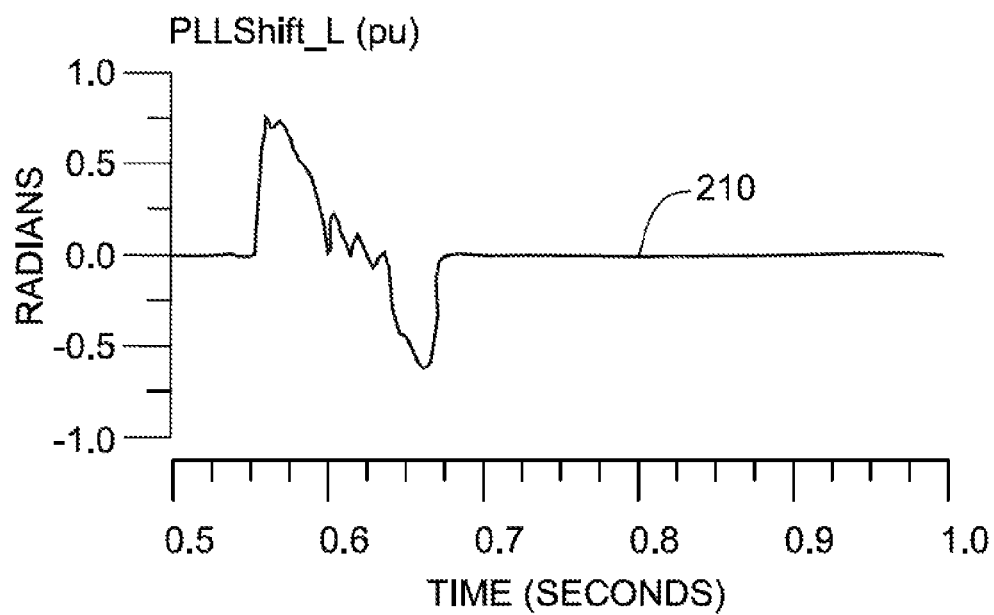

FIGS. 17 and 18 are graphical views of PLL shift signal 210 in radians versus time. FIG. 18 illustrates that without synchronization, no PLL shift signal 210 is provided to line angle firing control 82 (shown in FIG. 7). Therefore, sum 170 (shown in FIG. 8) of PLL phase angle signal 208 and PLL shift signal 210 equals PLL phase angle signal 208 which is configured to cause DC voltage 142 to exceed a predetermined value. FIG. 18 illustrates the addition of the PLL shift signal 210 to sum 170 of PLL phase angle signal 208 and PLL shift signal 210 results in a reduced magnitude PLL error signal 190, which does not drive DC voltage 142 to the level necessary to trip circuit breaker 60 (shown in FIG. 5), to facilitate continued operation of power generation system 150.

Figure 19:
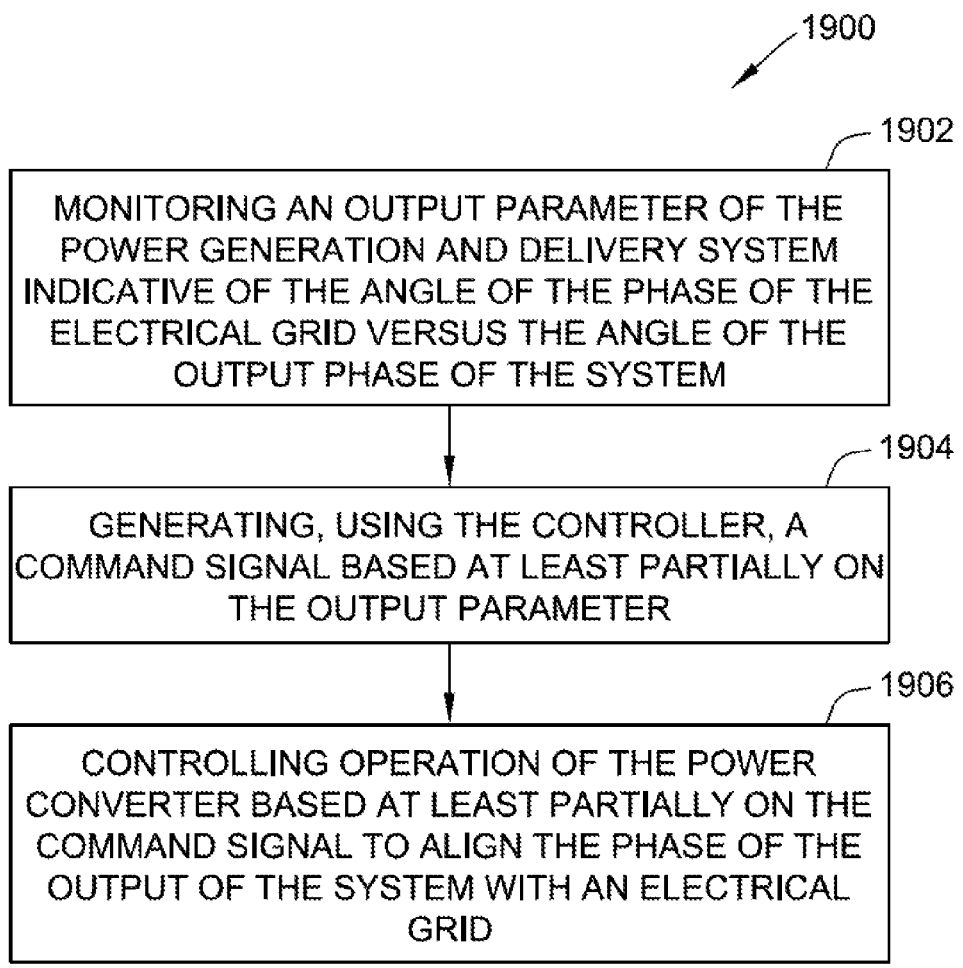
FIG. 19 is a flow chart of an exemplary method for controlling the power generation and delivery system shown in FIG. 5.

FIG. 19 illustrates a flow chart of an exemplary method 1900 for controlling the phase of the output of a power generation and delivery system, for example, power generation system 150 (shown in FIG. 6) connected to a electrical grid, such as electrical grid 136 (shown in FIG. 6). The power generation and delivery system may include an electrical generator, for example, a generator 34 (shown in FIG. 5), a power converter, for example, a power conversion assembly 42 (shown in FIG. 6), and a controller, for example, a converter interface controller 156 (shown in FIG. 6). Method 1900 includes monitoring 1902 an output parameter of the power generation and delivery system indicative of the angle of the phase of electrical grid versus the angle of the output phase of the system. Method 1900 includes generating 1904, using the controller, a command signal based at least partially on the output parameter. Moreover, method 1900 includes controlling 1906 operation of the power converter based at least partially on the command signal to align the phase of the output of system with the electrical grid. In the exemplary embodiment, monitoring the output parameter includes receiving, at the controller, a PLL error signal, for example, PLL error signal 190 (shown in FIG. 8). Moreover, generating a command signal, for example line converter angle reference signal 212 (shown in FIG. 8) includes comparing the PLL error signal to a threshold and generating PLL shift signal, for example, PLL shift signal 210 (shown in FIG. 8) based at least partially on the PLL error signal.

Embodiments described herein facilitate efficient and cost-effective operation of a wind turbine. The wind turbine includes a synchronizing system that generates a PLL shift signal based at least partially on a measured PLL error. The PLL shift signal is configured to align an output of an electrical generation and distribution system with a phase of an electrical grid. The method and systems described herein facilitate increasing the stability of the voltage and/or power output by the wind turbine following a grid contingency event in a weak AC transmission grid.

Exemplary embodiments of a wind turbine, synchronizing system, and methods for operating a wind turbine in response to an occurrence of a grid contingency event are described above in detail. The methods, wind turbine, and synchronizing system are not limited to the specific embodiments described herein, but rather, components of the wind turbine, components of the synchronizing system, and/or steps of the methods may be utilized independently and separately from other components and/or steps described herein. For example, the synchronizing system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for use with a power generation system coupled to an electrical grid, said controller comprising:
    a circuit configured to:
        receive a phase locked loop (PLL) error signal representative of a difference between a phase angle of the power generation system and a phase angle of the electrical grid;
        compare the PLL error signal to a threshold phase including a predefined upper threshold and a predefined lower threshold; and,
        generate a PLL shift signal based at least partially on the PLL error signal and the threshold phase.

2. A controller in accordance with claim 1, wherein the PLL shift signal is configured to align an output of the power generation system with a phase of the electrical grid.

3. A controller in accordance with claim 1, wherein said circuit is configured to generate at least one of the PLL shift signal equal to zero when the PLL error signal is defined within the upper threshold and the lower threshold.

4. A controller in accordance with claim 1, wherein said circuit is configured to generate at least one of the PLL shift signal equal to a function of the PLL error signal when the PLL error signal is defined outside the upper threshold and the lower threshold.

5. A controller in accordance with claim 1, said circuit further configured to receive the threshold phase from the electrical grid, wherein the threshold phase comprises the measured terminal voltage magnitude.

6. A synchronizing system for controlling operation of a power conversion assembly of a power generation system coupled to an electrical grid, said synchronizing system comprising:
    a phase locked loop (PLL) configured to:
        generate a PLL phase angle signal; and,
        generate a PLL error signal representative of a difference between a phase angle of the power generation system and a phase angle of the electrical grid;
    a line angle shift logic circuit configured to:
        receive the PLL error signal; and,
        generate a PLL shift signal based at least partially on the PLL error signal and a predefined threshold including a predefined upper threshold and a predefined lower threshold;
    a summing junction configured to utilize the PLL phase angle signal to produce a line converter angle reference signal; and,
    a controller configured to generate a plurality of line converter control signals based on the line converter angle reference signal and transmit the line converter control signals to the power conversion assembly.

7. A system in accordance with claim 6, wherein said summing junction is configured to add the PLL phase angle signal and the PLL shift signal to produce a line converter angle reference signal.

8. A system in accordance with claim 6, wherein said line converter control signals are configured to align a power generation system output with a phase of the electrical grid.

9. A system in accordance with claim 6, wherein said line angle shift logic circuit is further configured to:
receive a threshold phase from the electrical grid; and,
generate the PLL shift signal based at least partially on the threshold phase.

10. A system in accordance with claim 6, wherein the line converter angle reference signal is configured to maintain an output phase of the power generation system when the PLL error signal is defined within the upper threshold and the lower threshold.

11. A system in accordance with claim 10, wherein the line converter angle reference signal is configured to change the output phase of the power generation system from a first phase to a second phase that matches the phase of the electrical grid when the PLL error signal is defined outside of the upper threshold and the lower threshold.

12. A system in accordance with claim 6, wherein said controller is configured to reduce a phase difference between an output of the power generation system and a phase of the electrical grid based on the line converter angle reference signal.

13. A system in accordance with claim 6, said PLL further configured to receive a threshold phase from the electrical grid, wherein the threshold phase comprises the measured terminal voltage magnitude.

14. A system in accordance with claim 6, further comprising a rotor angle position sensor coupled to a generator shaft of the power generation system and configured to generate a rotor angle position signal, wherein said summing junction is configured to subtract the rotor angle position signal from the PLL phase angle signal to produce a rotor converter angle reference signal, and wherein said controller is configured to generate a plurality of rotor angle control signals based on the rotor converter angle reference signal and transmit the plurality of rotor angle control signals to the power conversion assembly.

15. A system in accordance with claim 14, wherein the plurality of rotor converter control signals are configured to align a phase of a power conversion assembly output with a phase of the electrical grid.

16. A method for controlling operation of a power generation system connected to an electrical grid, the power generation system including a power converter and a controller, said method comprising:
monitoring an output parameter of the power generation system indicative of a difference between a phase of the electrical grid and a phase of the output of the power generation system comprising receiving, at the controller, a phase locked loop (PLL) error signal representative of a difference between a phase of the power generation system and a phase of an electrical grid;
comparing the PLL error signal to a predefined threshold including a predefined upper threshold and a predefined lower threshold;
generating a PLL shift signal based at least partially on the comparison of the PLL error signal to the predefined threshold;
generating, using the controller, a command signal based at least partially on the output parameter; and,
controlling an operation of the power converter based at least partially on the command signal to prevent the system from tripping offline.

17. A method in accordance with claim 16, wherein generating the command signal comprises controlling an operation of the power converter based at least partially on the PLL shift signal to align the output phase of the power generation system with the phase of the electrical grid.

18. A synchronizing system for controlling operation of a power conversion assembly of a power generation system coupled to an electrical grid, said synchronizing system comprising:
a phase locked loop (PLL) configured to:
generate a PLL phase angle signal; and,
generate a PLL error signal representative of a difference between a phase angle of the power generation system and a phase angle of the electrical grid;
a line angle shift logic circuit configured to:
receive the PLL error signal; and,
generate a PLL shift signal based at least partially on the PLL error signal and a predefined threshold;
a summing junction configured to utilize the PLL phase angle signal and the PLL shift signal to produce a line converter angle reference signal; and,
a controller configured to generate a plurality of line converter control signals based on the line converter angle reference signal and transmit the line converter control signals to the power conversion assembly, wherein the line converter control signals are configured to maintain an output phase of the power generation system when the PLL error signal is defined within a predefined upper threshold and a predefined lower threshold.

* * * * *